3,174,958
COPOLYMERIZATION PROCESS
Ragnar S. Solvik, Wyoming, and Gerald A. Lessells, Sharonville, Ohio, assignors to National Distillers and Chemical Corporation, New York, N.Y., a corporation of Virginia
No Drawing. Filed May 4, 1960, Ser. No. 26,688
1 Claim. (Cl. 260—88.2)

This invention relates to an improved process for the preparation of copolymeric compositions and, particularly, to an improved process for the copolymerization of an aliphatic monoolefin monomer and a phenyl-substituted alpha olefin comonomer to produce a normally solid copolymer having a relatively high comonomer content. More particularly, the invention relates to copolymerization of an aliphatic alpha olefin and a phenyl-substituted alpha olefin in the presence of a combination catalyst system containing a titanium subhalide prepared by the reduction of a titanium tetrahalide with aluminum or with hydrogen.

The present invention is based on the discovery that, in a copolymerization process for a lower molecular weight α-olefin, e.g., ethylene, and a phenyl-substituted α-olefin, an unexpected improvement in relative reaction rates of the comonomers and in the relative proportion of phenyl-substituted α-olefin to aliphatic monoolefin in the copolymer can be obtained if the copolymerization takes place in the presence of a combination catalyst system containing a titanium subhalide prepared by $H_2$- or aluminum metal-reduction of titanium tetrahalide. It was also found that by using this unique catalyst system a greatly improved comonomer efficiency resulted.

Particularly suitable as the lower molecular weight aliphatically unsaturated hydrocarbon monomer is ethylene. The process, however, is applicable to other α-olefins such as propylene or higher olefins.

The comonomer for copolymerization with the aforesaid aliphatically unsaturated hydrocarbon monomer is a phenyl-substituted α-olefin, such as, for example, allylbenzene, styrene, α-methyl styrene, and the like.

It has been found that greatly improved copolymerization of these reactants may be obtained by contacting them with a two-component catalyst composition comprising (I) a reducing agent (herein termed cocatalyst) as, for example, an element from Groups I to III, inclusive, of the Periodic Table, a metal alkyl, a metal alkyl hydride, a metal alkyl halide, mixtures thereof, and so forth, and (II) a titanium subhalide, said subhalide being prepared by the reduction of a higher halide of the metal with aluminum or with hydrogen. The combination catalyst system is generally used in an amount of from about 0.01 to about 2.0 weight percent, based on the weight of the monomeric reactants subjected to the copolymerization. With regard to the relative proportions of the titanium subhalide to the cocatalyst in the combination catalyst system, said catalyst generally comprises (in mole ratio) one mole of the titanium subhalide to from about 0.25 to about 15 moles of the cocatalyst.

In further reference to the combination catalyst system, specific examples of the cocatalyst component, i.e., the reducing agent, include the elements such as sodium, lithium, magnesium, aluminum, zinc, etc.; metal alkyls such as triethylaluminum, triisobutylaluminum, dibutylmagnesium, methyldihexylaluminum, dibutylcadmium, diethylzinc, n-butyllithium; metal alkyl hydrides such as butylaluminum hydride, butylmagnesium hydride, including such hydrides normally present in aluminum alkyls; and metal alkyl halides such as the "sesquichlorides" diethylaluminum hydride, lithiumaluminum hydride, di(mixtures of alkylaluminumdichloride and dialkylaluminumchloride), diethylaluminum chloride, butylmagnesiumchloride, dibutylaluminumiodide, and others.

The other component of the combination catalyst system, namely a titanium subhalide, is generally a trichloride, although another subhalide such as the tribromide, triiodide, dichloride, etc., may be used. The titanium subhalide component of the combination catalyst system used in the process of this invention is readily prepared by treating the higher halide of said metal with hydrogen or with aluminum. For example, titanium tetrachloride may be reduced to titanium trichloride by treating the tetrachloride with aluminum at a temperature ranging from about 200° to about 700° C. to produce a complex mixture of $TiCl_3$ and $AlCl_3$. Thus specific examples of the combination catalyst systems embodied for use herein include the complexed $$3TiCl_3 \cdot AlCl_3$$

and triisobutylaluminum, the complexed $3TiCl_3 \cdot AlCl_3$ and triethylaluminum, $H_2$-reduced $TiCl_3$ and triethylaluminum, etc.

The copolymerization of the aforesaid reactants can be carried out over a wide range of temperatures but, preferably, at from about 40°0 to about 260° C. at a pressure that may range from about atmospheric up to about 6000 p.s.i. or even higher, such as up to about 30,000 p.s.i.

Copolymers as embodied herein can be prepared by copolymerizing about one mole of the monoolefinic aliphatic hydrocarbon with about 0.1 to about 15 moles of the phenyl-substituted α-olefin, with a more preferred embodiment being one mole of the aliphatic monoolefin per from about 1 to about 10 moles of the phenyl-substituted alpha olefin.

In general the copolymerization is carried out in the presence of a diluent or a liquid reaction medium that is inert with respect to the reactants and to the copolymer product. In some cases the use of such a medium that is a solvent for the copolymer product is not only desired but preferred. Thus substances such as aliphatic, aromatic, and alicyclic hydrocarbons; chlorinated hydrocarbons; etc., may be used, with specific examples being n-heptane, benzene, cyclohexane, decahydronaphthalene (decalin), $C_5$–$C_8$ saturated aliphatic petroleum fractions, chlorobenzene, and mixtures of these materials.

By practice of this invention, greatly improved comonomer efficiency and improved reaction velocity have been effected. The use of the two-component catalyst combination system of this invention has made it possible to obtain rapidly, and with the use of conventional polymerization techniques, a thermoplastic polymer in which the comonomer content is much higher than the comonomer content obtainable using polymerization techniques and catalysts known to those skilled in the art.

In one specific embodiment of the process described herein for the preparation of the copolymer product, an α-olefin (e.g., ethylene) is added to an inert liquid medium (e.g., decalin) maintained at 125° C. and containing a catalyst (e.g., $3TiCl_3 \cdot AlCl_3$ and triethylaluminum, the $3TiCl_3 \cdot AlCl_3$ having been made by reducing $TiCl_4$ with aluminum) and a phenyl-substituted alpha olefin (e.g., allylbenzene). In another instance, $TiCl_3$ produced by $H_2$-reduction of $TiCl_4$ is used with triethylaluminum as catalyst to produce these copolymer products.

made with no comonomer, and several runs (4, 5, 9 and 10) were carried out with catalysts other than those embodied by the present invention. Runs No. 4, 5, 9, and 10 have been included for purposes of comparison with runs using the catalyst systems embodied herein.

| Example | Catalyst Type | Cocatalyst Type [b] | Catalyst Concentration (grams per liter) | Cocatalyst/Catalyst Weight Ratio | Comonomer | Comonomer Concentration in Feed (Volume percent) | Comonomer Concentration in Copolymer (wt. percent) | Comonomer Converted (Weight percent) | Reaction time (hours) | Comonomer Converted (percent per hour) | Melting point of product (°C.) |
|---|---|---|---|---|---|---|---|---|---|---|---|
| 1 | $3TiCl_3 \cdot AlCl_3$ | TIA | [a] 0.1 | 0.5 | Allylbenzene | 2.0 | 19 | 15 | 1.0 | 15 | 120 |
| 2 | $3TiCl_3 \cdot AlCl_3$ | TIA | [a] 0.1 | 1.25 | do | 2.0 | 170 | 15 | 0.5 | 30 | 120 |
| 3 | $3TiCl_3 \cdot AlCl_3$ | TIA | [a] 0.1 | 2.5 | do | 2.0 | 15 | 15 | 0.5 | 30 | 125 |
| 4 | $TiCl_4$ [c] | TEA | 0.16 | 2 | do | 0.4 | <0.1 | ~0 | 0.2 | ~0 | 130 |
| 5 | $TiCl_4$ [c] | TEA | 0.16 | 5 | do | 0.4 | <0.1 | ~0 | 0.2 | ~0 | 130 |
| 6 | $TiCl_3$ [d] | TEA | [a] 0.1 | 1.0 | Styrene | 3.0 | 8.3 | 5 | 0.3 | 15 | 125 |
| 7 | $3TiCl_3 \cdot AlCl_3$ | TIA | [a] 0.1 | 1.25 | do | 2.0 | 7.7 | 11 | 1.0 | 11 | 140 |
| 8 | $3TiCl_3 \cdot AlCl_3$ | TIA | [a] 0.1 | 2.5 | do | 2.0 | 9.2 | 13 | 1.0 | 13 | 140 |
| 9 | $TiCl_4$ | TEA | 0.16 | 0.5 | do | 2.0 | <0.1 | ~0 | 5 | ~0 | 125 |
| 10 | $TiCl_4$ | TEA | 0.16 | 2 | do | 3.0 | <0.1 | ~0 | 1 | ~0 | 125 |
| 11 | $TiCl_4$ | TEA | 0.16 | 2 | None | | | | 0.5 | | 125-135 |

[a] Concentration refers to $TiCl_3$ portion.
[b] TIA=Triisobutylaluminum.
TEA=Triethylaluminum.
[c] $TiCl_4$ saturated with $VCl_4$ at 25° C.
[d] Prepared by reducing $TiCl_4$ with hydrogen.
Conditions: Temperature—125° C. Pressure—60 mm. Hg gauge. Monomer—Ethylene.

The more detailed practice of the invention is illustrated by the following examples wherein parts are given by weight unless otherwise specified.

*Example 1.*—To 500 parts of decalin at 125° C. sufficient triisobutylaluminum and $3TiCl_3 \cdot AlCl_3$ (prepared by the reduction of $TiCl_4$ with aluminum) were added to provide concentrations of 0.05 and 0.1 gram/liter, respectively, i.e., a weight ratio of cocatalyst to catalyst of 0.5. Ten parts of allylbenzene was added to the reactor, and ethylene was then supplied to the mixture on a demand basis to maintain a constant pressure of 60 mm. Hg gauge. After one hour a soft, rubbery copolymer was obtained which contained 19 weight percent of allylbenzene and melted at 120° C.

*Example 2.*—The procedure of Example 1 was repeated, except that the weight ratio of cocatalyst to catalyst was 1.25. The copolymer obtained in 0.5 hour had a comonomer concentration of 17 weight percent and a melting point of 120° C. Its ultimate strength was 2,900 p.s.i. and its flexural stiffness, 22,000 p.s.i.

*Example 3.*—The procedure of Example 1 was repeated except that the weight ratio of cocatalyst to catalyst was 2.5. After 0.5 hour a copylmer was obtained that had a comonomer concentration of 15 weight percent and a melting point of 125° C.

*Example 6.*—To 500 parts of decalin at 125° C. sufficient triethylaluminum and $TiCl_3$ (prepared by the hydrogen reduction of $TiCl_4$) were added to provide a concentration of 0.1 gram/liter of each catalyst. Fifteen parts of styrene was added to the reactor, and ethylene was supplied to the mixture on the demand basis to maintain a constant pressure of 60 mm. Hg gauge. After twenty minutes 8.7 parts of copolymer containing 8.3 weight percent styrene was obtained.

The following tabulation sets forth, in addition to data pertaining to Examples 1, 2, 3, and 6, data obtained from additional runs (Nos. 7 and 8) for several further embodiments of this invention. One run (No. 11) was As is evidenced by the data in the foregoing tabulation, more rapid copolymerization and copolymerization products having higher comonomer contents result when the polymerization catalyst contains a subvalent titanium halide, as embodied herein, instead of the conventional tetravalent metal halide as a component of a combination catalyst system. The copolymers embodied herein posses strength and stiffness characteristics which make them particularly applicable for use in wire, electrical insulation, construction materials for chemical equipment, film, and other applications wherein resistance to stress-corrosion cracking, embrittlement, and chemical attack is desirable.

While there are above disclosed but a limited number of embodiments of the invention herein presented, it is possible to produce still other embodiments without departing from the inventive concept thereof. It is desired, therefore, that only such limitations be imposed upon the appended claim as are stated therein.

What is claimed is:

In a process for the copolymerization of ethylene and a phenyl-substituted alpha olefin monomer selected from the group consisting of styrene and allylbenzene, the improvement which comprises copolymerizing in the presence of a catalyst consisting essentially of (*a*) an aluminum trialkyl co-catalyst reducing agent and (*b*) titanium trichloride prepared by reducing titanium tetrachloride with a member of the group consisting of hydrogen and aluminum, the total catalyst being present in an amount ranging from about 0.01 to about 2.0 weight percent, based on the weight of the monomeric reactants, and the catalyst system comprising one mole of titanium trichloride to from about 0.25 to about 15 moles of the cocatalyst reducing agent.

(References on following page)

References Cited by the Examiner

UNITED STATES PATENTS

| | | | |
|---|---|---|---|
| 2,839,518 | 6/58 | Brebner | 260—94.9 |
| 2,868,772 | 1/59 | Ray et al. | 260—94.9 |
| 2,972,608 | 2/61 | Coover et al. | 260—93.7 |
| 3,002,962 | 10/61 | Claiborne et al. | 260—93.7 |
| 3,032,513 | 5/62 | Tornqvist | 260—93.7 |

FOREIGN PATENTS 553,694   6/57   Belgium.

OTHER REFERENCES

Ruff et al.: "Zeitschrift für Anorganishe Chemie," (1923), vol. 128, pages 81–95 (page 84 only needed).

JOSEPH L. SCHOFER, *Primary Examiner.*

L. H. GASTON, M. LIEBMAN, WILLIAM H. SHORT, *Examiners.*